(12) United States Patent
Shkolnikov et al.

(10) Patent No.: US 7,936,274 B2
(45) Date of Patent: May 3, 2011

(54) SHIELD FOR RADIO FREQUENCY ID TAG OR CONTACTLESS SMART CARD

(75) Inventors: Yakov Pytor Shkolnikov, Princeton, NJ (US); Yanqing Du, Zhejiang (CN); Brad Alexander McGoran, Zhejiang (CN)

(73) Assignee: Exponent Inc., Menlo, CA (US)

( * ) Notice: Subject to any disclaimer, the term of this patent is extended or adjusted under 35 U.S.C. 154(b) by 430 days.

(21) Appl. No.: 11/848,209

(22) Filed: Aug. 30, 2007

(65) Prior Publication Data

US 2008/0055093 A1 Mar. 6, 2008

Related U.S. Application Data

(60) Provisional application No. 60/841,347, filed on Aug. 30, 2006.

(51) Int. Cl.
*G08B 13/14* (2006.01)

(52) U.S. Cl. ............... 340/572.8; 340/572.1; 340/10.1; 340/10.5

(58) Field of Classification Search ............... 340/572.1, 340/10.1
See application file for complete search history.

(56) References Cited

U.S. PATENT DOCUMENTS

| | | | | |
|---|---|---|---|---|
| 6,121,544 A | * | 9/2000 | Petsinger | 174/353 |
| 7,109,865 B2 | * | 9/2006 | Paradiso et al. | 340/572.1 |
| 7,482,925 B2 | * | 1/2009 | Hammad et al. | 340/572.1 |
| 2004/0061612 A1 | * | 4/2004 | Paradiso et al. | 340/572.1 |
| 2006/0044206 A1 | * | 3/2006 | Moskowitz et al. | 343/841 |
| 2006/0290501 A1 | * | 12/2006 | Hammad et al. | 340/572.1 |
| 2007/0013523 A1 | * | 1/2007 | Paradiso et al. | 340/572.1 |
| 2007/0222601 A1 | * | 9/2007 | Keyaki et al. | 340/572.6 |
| 2008/0186186 A1 | * | 8/2008 | Campbell | 340/572.8 |
| 2009/0088229 A1 | * | 4/2009 | Hammad et al. | 455/575.5 |
| 2009/0146814 A1 | * | 6/2009 | Hammad et al. | 340/572.1 |
| 2009/0166421 A1 | * | 7/2009 | Finn | 235/439 |

* cited by examiner

*Primary Examiner* — Travis R Hunnings
(74) *Attorney, Agent, or Firm* — Kimberly Cameron

(57) ABSTRACT

We have found that to effectively shield inductively coupled RFID systems, the shield does not have to be present on all the sides of the device. It is also not required that one side be covered completely. In fact, a shield of any shape that allows a current to flow in a closed loop may be enough to shield the RFID. The only requirement is that the back electromagnetic field (EMF) from the shield induces sufficient flux to cancel all or part of the magnetic flux coming from the reader. It is possible for the shield to work even if the induced flux is small: the shift in the self-inductance of the RFID or contactless card coil due to the presence of the material in the shield can be enough to cause a shift in a resonant frequency of the circuit and thus in the power delivered to the chip. The current invention is a shield that does not completely cover a smartcard or RFID tag and/or has a hole or void within the shield. The advantage of this invention is that it will allow optical and mechanical access to the surface and the body of the smartcard or RFID tag and/or to parts of the smartcard/RFID coil. It also leads to significant cost savings since less shielding material is used.

3 Claims, 6 Drawing Sheets

6               9          9 6

SHIELD FOR RADIO FREQUENCY ID TAG OR CONTACTLESS SMART CARD

This application claims priority of provisional application 60/841347, filed on Aug. 30, 2006.

BACKGROUND

1. Field of the Invention

This invention relates to electromagnetic shields, in particular ones that are used to shield contactless smart cards or RFID microchips and prevent unwanted wireless exchange of data between the card or chip and a remote transceiver (reader).

2. Description of Prior Art

Contactless "smart cards" (smart because they contain an embedded electronic computation device, also called an electronic computation means) are able to store a relatively large amount of data on an imbedded microchip. Unlike magnetic strip cards such as the conventional credit card, and contact smartcards with exposed electronic contacts for communicating with the embedded electronic computation device, contactless smart cards can exchange information with a "reader," via electromagnetic energy transfer such as magnetic, RF, infrared radiation or light without coming into physical contact with the reader. The inductive coupling between the reader and the card is used to transfer both the energy necessary to energize the embedded electronic storage device and the electronic data that may be stored in the embedded electronic device or devices. The electrical signal transfer is based on a technique that can be described as a loosely coupled transformer means. A strong, high-frequency magnetic field is typically generated by a coil in the reader in order to transfer the energy and data to and from the embedded electronic device or devices.

When a contactless smart card is brought into the vicinity of the reader, a portion of the reader's magnetic field passes through an antenna (typically a coil) in the card induces a voltage in the antenna, and initiates current flow. This is the typical mechanism for the energy transfer between the reader and the card without direct physical contact between the reader and the card. Information on the card is then "broadcast" back to the reader by the embedded electronic device or devices in the card through a broadcast means built into the card.

The use of the contactless card technology enables convenient, quick exchange of information stored on the embedded electronic means in the in card. However, due to the convenient contactless information transfer feature, the card can be susceptible to unwanted information transmission to an unauthorized receiver that appropriately excites the embedded electronic means. In addition, if the card is energized by an undesired or unauthorized reading means (aka "snooping"), and a data transfer initiated, the person carrying the card has no knowledge of the card's unauthorized access and transmission. Interrogation can occur regardless of where on his person the individual is carrying the card. Encryption and other security features and communication protocols are currently used to help protect the integrity of the card information and its signal, but another layer of physical protection means is beneficial.

The chips used in smartcards can also be manufactured in a less sophisticated form called a Radio Frequency Identification (RFID) chip. These chips come in several different embodiments for various applications such as tracking and commerce. The information on these chips is also capable of being remotely accessed without the owner's knowledge or consent.

There is a strong interest to protect RFID enabled cards, tags and devices from snooping. Currently, some physical shielding means for RFID and contactless smart cards consist of a container that enclose all sides of the device (Faraday cage) through use of a conductive material such as a metal to prevent RF signals from entering or escaping the inside of the shield. For example, Cord Technologies developed a product called SMARTSHIELD that completely encloses the smartcard and is made from a high-nickel content metal alloy that can shield the contactless card from magnetic fields. Likewise, U.S. Pat. No. 6,121,544 issued to Petsinger (2000) describes a shield that uses a sheet of magnetic shielding material shaped to substantially surround the contactless smartcard with sufficient thickness to reduce the magnetic field strength inside the shield to below the threshold required to power the smartcard.

Magnetically shielded card holders do currently exist for magnetic strip cards but the purpose of these shields is to protect the data stored on the magnetic strip from stray magnetic fields (such as from televisions and speakers) that can inadvertently damage the magnetic strip. See for example, U.S. Pat. No. 4,647,714 issued to Goto (1987) or U.S. Pat. No. 5,288,942 issued to Godry and Westfield (1994). Likewise, other shields that currently exist are designed to shield the chip from the effects of electrostatic potential accumulations and discharges while being receptive to magnetic fields. See for example U.S. Pat. No. 5,360,941 issued to Roes (1994). Additionally, neither of these types of shields allows control over when a data exchange takes place between the card or tag and the reader.

SUMMARY OF THE INVENTION

Radio Frequency Identification (RFID) at a frequency of 13.56 MHz works on the inductive coupling principle. First, the reader powers the embedded electronic means such as a RFID chip via a high rate of change of magnetic field (flux) through the card coil. The RFID chip modulates the resistance in series with a card coil, and this modulation is coupled to the reader through the modification of the flux in the reader coil. The coupling of the flux between the reader coil and the card coil is parameterized using M, the mutual inductance of the reader and the card coil. The shielding works by reducing this value of the mutual inductance. In a low frequency regime, when the wavelength of electromagnetic radiation ($\lambda$=22 m at 13.56 MHz) is much larger than the structure (0.1 m), one can split the shielding effects into two parts: shielding due to a high permeability ($\mu$) material, and shielding due to eddy currents. In non-faraday cage geometry, the first shielding means is not present; thin plates of high $\mu$ material do not shield the field in the direction of the normal of the plane and for inductively coupled RFID, field parallel to the receiving coil (and thus to the high $\mu$ material plate) does not matter as the induced EMF due to that field in the RFID coil is zero anyway.

To understand the principle of the eddy current shielding, we can make a simplified geometric model shown in. In this example, an RFID system with the shield is shown as three simplified coils: a reader (1), the shielding means (2), and a card coil (3). As shown in, first, the current in the reader coil (1) produces magnetic flux (4). The rate of change in the magnetic flux induces current in the shielding means (2) (which has much lower resistance than the card coil). This shield current induces a magnetic field (5) that cancels out the magnetic flux due to the reader current. Thus the induced voltage in the card coil (3) is much lower than it would be in the absence of the shielding means.

For the shielding means to work, the distance between the shielding means and the card antenna should be relatively small, and the shield resistance should be low such that the electromotive field induced by the reader's magnetic field can produce a shield current that is large enough to result in flux cancellation. Using circuit equations one can derive that optimally the shield coil resistance should be less than $4\pi fL$, where L is the self-inductance of the shield.

We have found that for inductively coupled RFID systems, the shield does not have to be present on all the sides of the device. It is also not required that one side be covered completely. In fact, a shield of any shape that allows a current to flow in a closed loop may be enough to shield the RFID. The only requirement is that the back electromagnetic field (EMF) from the shield induces sufficient flux to cancel all or part of the magnetic flux coming from the reader. It is possible for the shield to work even if the induced flux is small: the shift in the self-inductance of the RFID or contactless card coil due to the presence of the material in the shield can be enough to cause a shift in a resonant frequency of the circuit and thus in the power delivered to the chip.

The current invention is a shielding means that does not completely cover a smartcard or RFID tag and/or has a hole or void within the shield. The advantage of this invention is that it will allow optical and mechanical access to the surface and the body of the smartcard or RFID tag and to parts of the smartcard/RFID coil. It also leads to significant cost savings since less shielding material is used.

An additional advantage of a non-contiguous shielding means is that it offers the possibility of controlling how and whether the electrical current path is open or closed; this, in turn, dictates whether or not the shield is preventing a RFID tag, contactless smartcard, or other RFID device from being read. This allows the advantage of easily enabling or disabling the reading ability of RFID devices, even without removing the devices from the shield. Thus, the card is read only when required, and yet protected at other times. The control to open or close the shielding means can be mechanical, electrical, or optical. Additionally, such controls do not necessarily require user intervention. For example, a light shining on an integrated photodiode in the RFID shield can open the electrical circuit and prevent the current from flowing in the shield. Then the card can be read until the light is turned off or blocked or the card is separated from the shield. Additionally, a "virtual shield" can be implemented by moving optical sensor into the card itself as specified in Detailed Description of the Invention.

The shielding means does not need to be made purely from conductive materials, it can be a composite or a ply of metallic and/or insulating (or poorly conducting) material intended to protect the surface of the RFID device mechanically, optically, chemically, radiologically, or electrically. Another use for nonconductive materials could be to make the overall structure more rugged, or in general to increase its performance in the field. The shield means material should have low sheet resistance at high frequencies. Although not the only possibility, the best choice for a shielding means material is a non-ferrous material with $\mu/\mu_{vacuum}=1$, with thickness of the skin depth or greater, and a high value of the bulk conductivity. Aluminum would be a good practical choice of material because, in addition to having a high conductivity, it is readily available in large thin sheets, it is relatively inexpensive, and it has a high corrosion resistance (specifically to NaCl and $O_2$). Also, after thermally treating aluminum with other elements, the resulting aluminum alloys can have a very high value for yield strength and hardness.

The FIG. 3, FIG. 4, FIG. 5, and FIG. 6 are design drawings that represent examples of specific embodiments of the invention.

DETAILED DESCRIPTION OF THE INVENTION AND PREFERRED EMBODIMENTS

The use of a shield to modify the mutual inductance of the reader and the card and/or self-inductance of the card antenna allows for a shield design that can be tailored closely to requirements of multiple applications. This invention can be used to design a physical shield for "smart" contactless ID badges that are meant to both be read by a remote transceiver as well as be displayed visibly while inside the holder. Several different embodiments of a badge holder have been implemented and tested with cards that adhered to ISO/IEC7810 standard.

Although other materials can be used, aluminum is an inexpensive effective shielding material that can completely block a standard smartcard reader (for example Model SDO10, 13.56 MHz card readers sold by SCM Microsystems) when covering one side of a typical contactless smartcard. Even when a 2.5 cm strip along the side of the smartcard is exposed, a shield covering the remaining portion has been shown to reduce the distance at which a standard card reader can read the smartcard to 18% of the distance at which the card reader can read the unshielded card. To prevent even this slight decrease in shielding efficiency, the card holder can have a mechanism to position the card and shield to prevent the card from sliding away from the shield.

Figure 1:
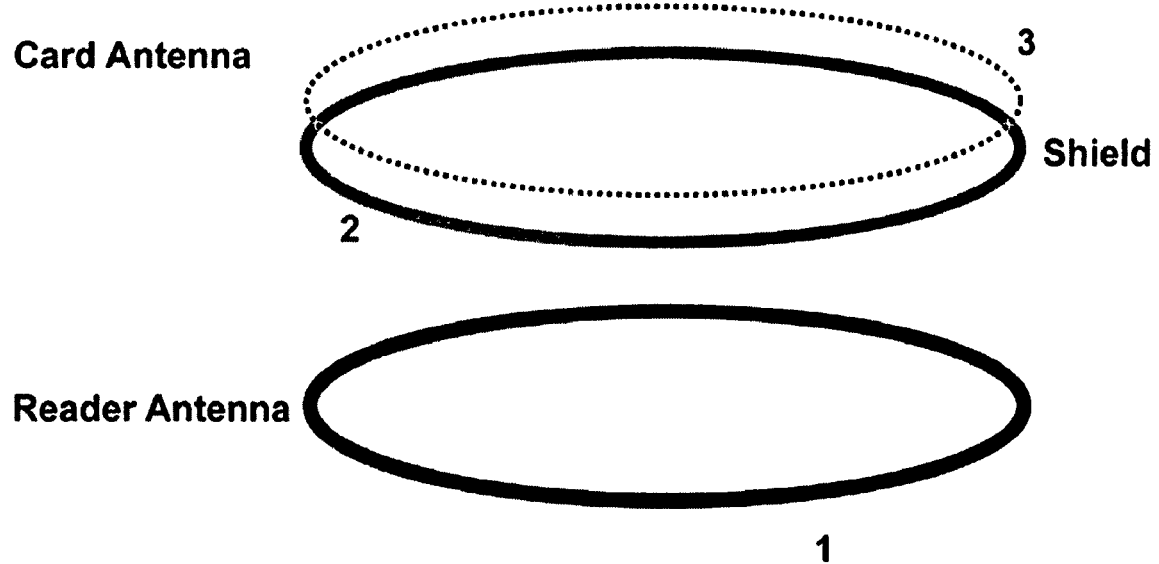
FIG. 1 is the simplified geometry of the reader, shield and card.
Figure 2:
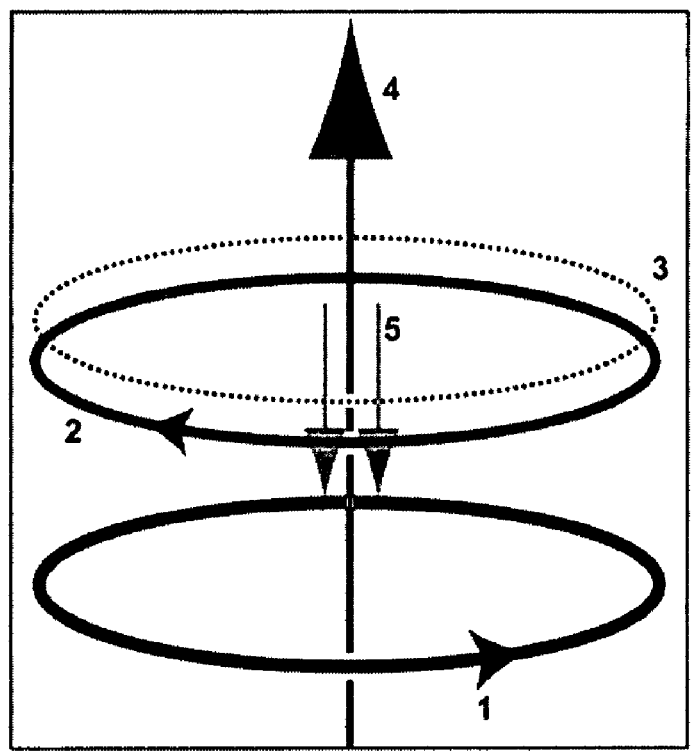
FIG. 2 illustrates the physics of eddy current shielding.
Figure 3:
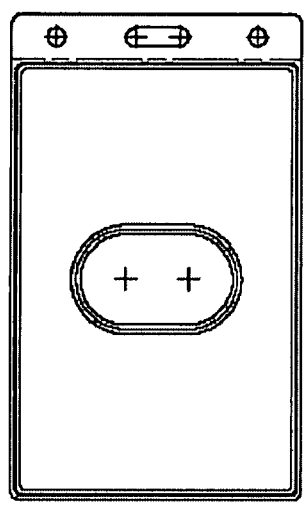
Figure 3:
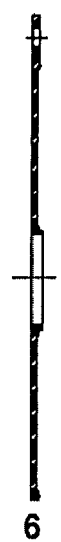
Figure 3:
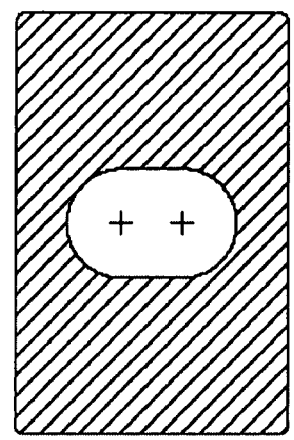
Figure 3:
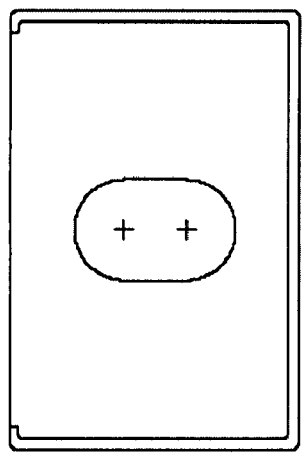
Figure 3:
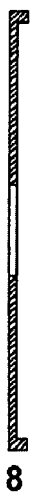
Figure 3:
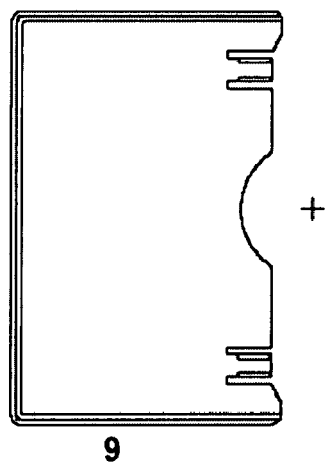
Figure 3:
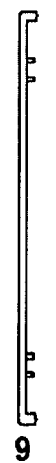
Figure 3:
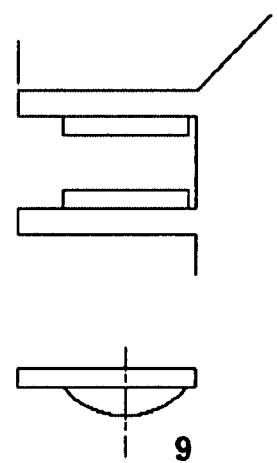
Figure 4:
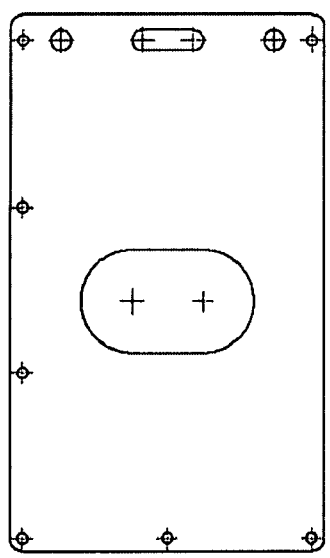
Figure 4:
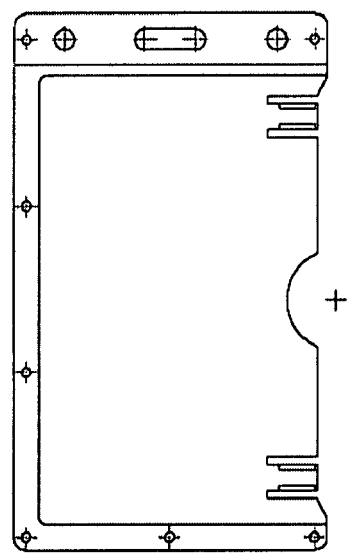
Figure 4:
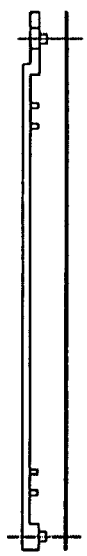

One embodiment, shown in FIG. 3, involves sandwiching the shielding aluminum means or its alloy piece (FIG. 3, part 6) between two pieces of plastics (FIG. 3, parts 7 and 8) at the back of the cardholding means. The advantages of this cardholder design is good shielding, good protection to the ID card, good protection to the shielding material since it is in between two plastic pieces and low cost. The front piece of the cardholder that secures the card in place is shown in FIG. 3, part 9. One drawback to this particular embodiment is that the holder is slightly bulky compared to non-shielding holders due to the extra plastic layer in the middle. Another embodiment, shown in FIG. 4, involves using an aluminum plate or its alloy (FIG. 4, part 6) directly as the back piece of the cardholder. The front of the holder can be a polymeric material as shown in FIG. 4, part 9) that allows visual inspection of the inserted card. A side view of the assembly is also shown in FIG. 4.

Figure 5:
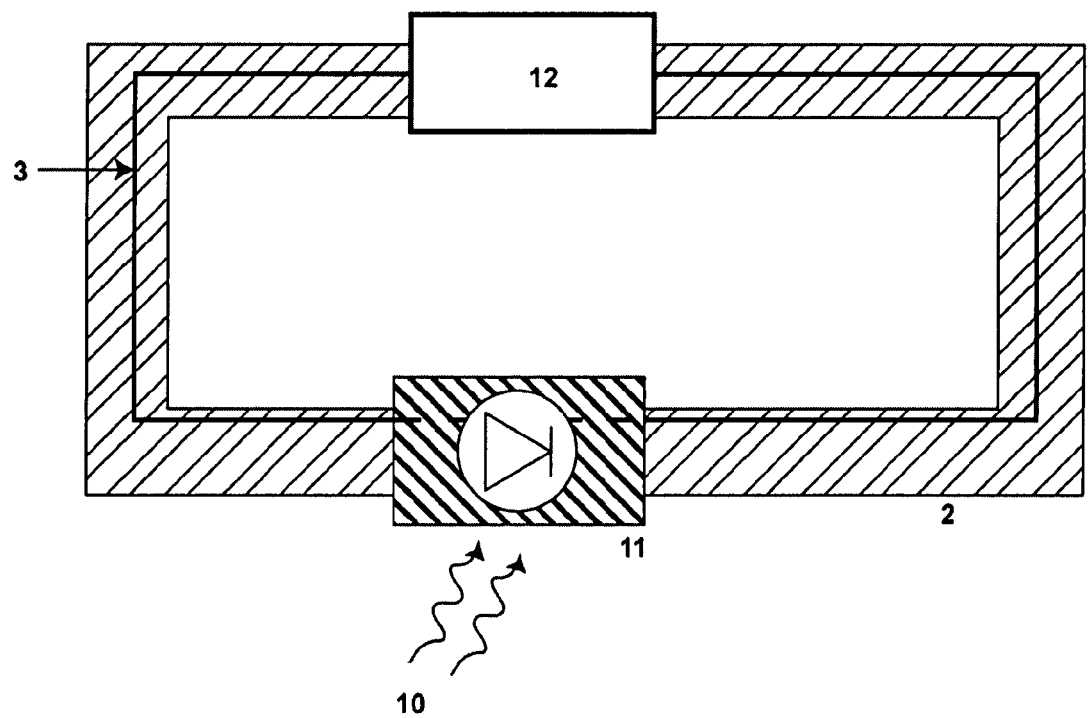

A schematic for one potential preferred embodiment is shown in FIG. 5. In this drawing, light (10) is received by an optical detector (11) which controls the current through the shield (2) to modify how much current is induced in the card coil (3) which in turn affects its ability to power RFID circuitry and electronics (12). As shown in the schematic, this embodiment allows the shield to be controlled so that the smartcard user does not have to remove the smartcard from the shield in order to have the smartcard be readable by the remote transceiver. This adds a level of convenience and security to the design since the card is less likely to be inadvertently left in an unshielded position. Since the surface of the card can be accessed in this embodiment, the control of the shielding switch can, among other things, be optical, mechanical or electrical. One example of an electrical actuation technique would be to use electromagnetic waves. The optical receiver/switch can be easily replaced by many other electrical and mechanical switches; how to implement such a control would be obvious to a person with ordinary skill in this area. For example, a simple push-button switch, or a microprocessor-controlled transistor can be used, as well as any other circuit that momentarily interrupts the current path through the shield. Alternatively, one can use an embodiment such as the ones shown in FIG. 3 or FIG. 4 and exert mechanical force by pushing through the opening in the shield to deflect the card away from the shield a sufficient distance to allow the card to be read. Obvious alternative methods exist such as using hinges to manipulate the distance of the shield from the card; in this configuration, rotating or moving the shield away from the card will allow the card to receive and transmit signals.

Figure 6:
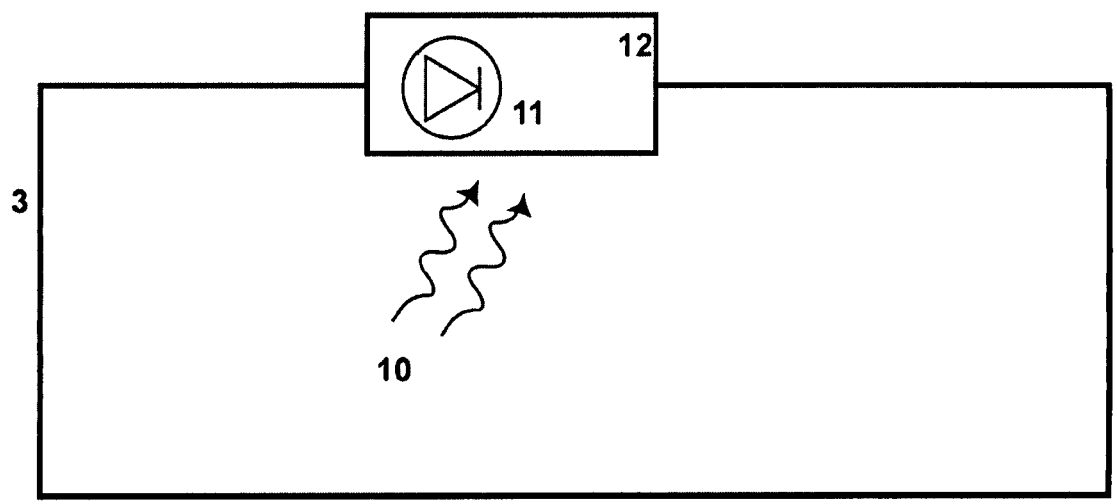

Another embodiment is to implement an optical sensing means such that it becomes part of the RFID circuitry or antenna means to allow control of the smartcard directly without the need for a shield. This concept is shown in FIG. 6. Here, the optical detector (11) is embedded in the RFID electronics (12) and the reception of light controls whether the RFID chip responds to the interrogating signal from the reader coil. An easy alternative is to move the optical detector such that it controls the current through the antenna circuit (3) rather than the RFID chip. Again, optical receiver/switch can be easily replaced by many other electrical or mechanical switches.

An optical switch or other device can be effectively used to interrupt or control the current or smartcard operation regardless of the operating frequency of the device. Such switches can also be configured for response to nearly all RF or UV frequencies Testing was done to verify the effectiveness of the shielding device. The shield completely blocked the reader from accessing the card even when the card was in direct contact with the reader. Tests with electrical interruption of the current flow have indicated that designs such as that shown in FIG. 5 (with the push-button switch) effectively allow users to control whether or not the card or RFID device is shielded.

We claim:

1. A means for shielding at least one contactless smartcard or RFID tag from communicating with a remote transceiver comprising a non high magnetic permeability material that is shaped such that a change in magnetic flux from said remote transceiver will induce an electric current to flow in a closed loop in said material, wherein said electric current induces sufficient flux to cancel at least part of the magnetic flux from said remote transceiver, wherein said material has an opening, void or interruption and said material does not completely surround said smartcard or RFID tag, wherein said opening, void or interruption can be used to prevent said electric current from flowing in said closed loop and said opening, void or interruption can be opened or closed optically.

2. A means for shielding at least one contactless smartcard or RFID tag from communicating with a remote transceiver comprising a non high magnetic permeability material that is shaped such that a change in magnetic flux from said remote transceiver will induce an electric current to flow in a closed loop in said material, wherein said electric current induces sufficient flux to cancel at least part of the magnetic flux from said remote transceiver, wherein said material has an opening, void or interruption and said material does not completely surround said smartcard or RFID tag, wherein said opening, void or interruption can be used to prevent said electric current from flowing in said closed loop and said opening, void or interruption can be opened or closed via electrical means.

3. A device for shielding at least one contactless smartcard or RFID tag from communication with a remote transceiver comprising:

a non high magnetic permeability material shaped such that a change in magnetic flux from said remote transceiver will induce an electric current to flow in a closed loop in said material, wherein said electric current induces sufficient flux to cancel at least part of the magnetic flux from said remote transceiver, wherein said material has an opening, void or interruption and does not completely surround said smartcard or RFID tag, wherein said opening, void or interruption can be used to prevent said electric current from flowing in said closed loop and said opening, void or interruption can be opened or closed via electrical means, and means to physically position said material relative to said contactless smartcard or RFID tag such that said material can induce sufficient flux to cancel at least part of the magnetic flux from said remote transceiver.

* * * * *